United States Patent
Sangha et al.

(10) Patent No.: US 12,451,746 B2
(45) Date of Patent: Oct. 21, 2025

(54) PCB CONNECTOR

(71) Applicant: Hamilton Sundstrand Corporation, Charlotte, NC (US)

(72) Inventors: Parminder Sangha, West Midlands (GB); Andrew Mclean, Halesowen (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 285 days.

(21) Appl. No.: 17/856,127

(22) Filed: Jul. 1, 2022

(65) Prior Publication Data

US 2023/0006493 A1   Jan. 5, 2023

(30) Foreign Application Priority Data

Jul. 2, 2021  (EP) ..................... 21275091

(51) Int. Cl.
- *H02K 3/38* (2006.01)
- *H02K 3/50* (2006.01)
- *H02K 5/22* (2006.01)

(52) U.S. Cl.
CPC ............... *H02K 3/38* (2013.01); *H02K 3/50* (2013.01); *H02K 5/225* (2013.01); *H02K 2203/03* (2013.01); *H02K 2211/03* (2013.01)

(58) Field of Classification Search
CPC ...................................................... H02K 3/38
See application file for complete search history.

(56) References Cited

U.S. PATENT DOCUMENTS

| | | | |
|---|---|---|---|
| 3,984,712 A * | 10/1976 | Hill | H02K 3/50 310/71 |
| 8,558,425 B2 | 10/2013 | Stahlhut et al. | |
| 9,800,109 B2 | 10/2017 | Shaw | |
| 10,951,080 B2 | 3/2021 | Mikail et al. | |
| 11,303,186 B2* | 4/2022 | Lazarewicz | H02K 1/20 |
| 2020/0227969 A1* | 7/2020 | Xu | H01R 4/187 |
| 2022/0200367 A1* | 6/2022 | Sangha | H02K 3/12 |
| 2023/0006493 A1* | 1/2023 | Sangha | H02K 5/225 |
| 2023/0188012 A1* | 6/2023 | Roadley-Battin | H02K 11/02 310/68 R |
| 2023/0387734 A1* | 11/2023 | Beyerl | H02K 3/522 |

FOREIGN PATENT DOCUMENTS

| | | | |
|---|---|---|---|
| CN | 201674297 U | * 12/2010 | |
| CN | 110829671 A | * 2/2020 | |
| DE | 202015006632 U1 | 9/2016 | |
| EP | 2154768 A2 | 2/2010 | |
| WO | WO-2017008685 A1 | 1/2017 | |
| WO | WO-2021125806 A1 | * 6/2021 | H02K 1/182 |

OTHER PUBLICATIONS

Extended European Search Report for European Patent Application No. EP21275091.3, dated Dec. 14, 2021.

* cited by examiner

*Primary Examiner* — Robert W Horn

(57) ABSTRACT

A connection assembly for providing electrical connection of a multi-strand wire conductor to another component, comprising a printed circuit board, PCB, whereby the conductor can be connected to a conductive segment or track of the PCB which is also connected to the other component.

20 Claims, 2 Drawing Sheets

PCB CONNECTOR

CROSS REFERENCE TO RELATED APPLICATIONS

This application claims priority to and the benefit of European Patent Application No. 21275091.3 filed Jul. 2, 2021, the entire content of which is incorporated herein by reference.

TECHNICAL FIELD

The present disclosure is concerned with providing improved connections between conductive components in high power density motors and drives.

BACKGROUND

High power density motors and drives are used in many applications e.g. for electric propulsion, fuel pumping, actuation and other applications. Such high power density motors and drives are able to replace traditional hydraulic and pneumatic drives with electrical power to improve system functionality, reliability and maintainability. This has proved beneficial in many fields e.g. in aircraft where the trend is towards more electric aircraft, MEA, or all electric aircraft, AEA. Such drives/motors may operate at a high fundamental frequency. Because of this, high frequency losses can occur in different parts of the drive/motor. Particularly in fault tolerant machines, it is necessary to have complete electrical and magnetic isolation between different windings or winding channels so as not to propagate electrical faults through the system. This can be hard to achieve using conventional methods, as connections between coils of same phases have to pass over end windings of other phases or connections to form neutral points may pass over other end windings.

Losses can be addressed by, for example, using thinner laminations to form the stator or rotor core and/or by using multi-stranded wire (e.g. Litz wires) for the windings, so as to reduce eddy current effects, proximity effects and circulating currents within the conductor bundle, and the associated losses. The use and advantages of multi-strand wires in AC motors is well-known in the field and will not be described further here. Eddy currents in the magnets of permanent magnet motors can be reduced by segmenting the magnets in the radial and axial directions as is also known in the art. In low frequency applications, multi-strand wire may be simplified to single core magnet wire, since eddy current losses are reduced.

Although known solutions exist for reducing losses in the core, coils and magnets, losses still arise due to connections between different parts of the drive/motor. It is difficult to make low resistance connections between different parts of the windings, or to connect windings in star configurations and/or to connect the windings to external system components. Connecting using soldering or brazing increases resistance and, therefore, introduces losses. Soldering or brazing multi-strand wires can take away from the advantageous effects of the multi-strand wire construction by fusing the individual wires together at the weld. Conventionally, in motors, windings are connected by passing leads from the different phases over end-windings which add bulk to the system and require additional insulation for electrical isolation.

There is, therefore, a need to provide for improved electrical connections in such high power density motors or drives that reduces losses and minimises or eliminates the risk of faults propagating from one phase or channel to another.

SUMMARY

According to the disclosure, there is provided a connection assembly for providing electrical connection of magnetic wire conductors to another component, comprising a printed circuit board, PCB, whereby the conductor can be connected to a conductive segment or track of the PCB which is also connected to the other component.

Also according to the disclosure, there is provided a motor including such a connection assembly.

There is also provided a method of connecting a conductive winding of a motor to another component comprising fixing the conductive wire to a conductive segment of a printed circuit board and electrically connecting the other component to the conductive segment.

BRIEF DESCRIPTION

Examples according to the disclosure will now be described with reference to the drawings. These are by way of example only and variations are possible within the scope of the claims.

DETAILED DESCRIPTION

Figure 1A:
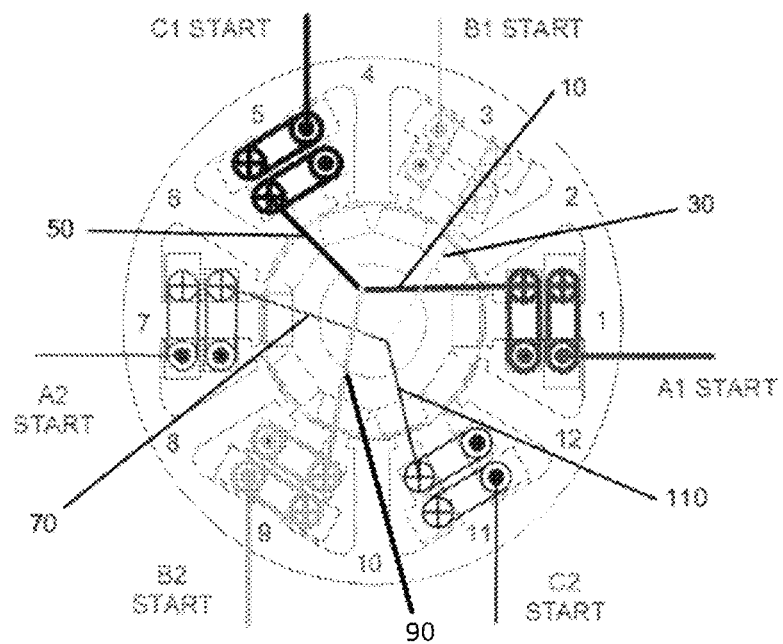
FIG. 1A shows a fault tolerant winding concept that can incorporate connectors according to the disclosure.
Figure 1B:
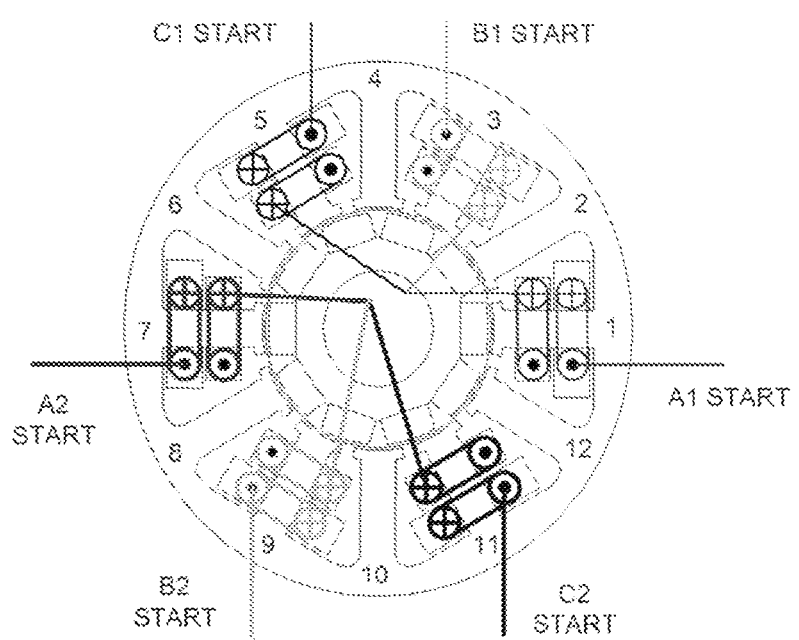
FIG. 1B shows an alternative fault tolerant winding concept that can incorporate connectors according to the disclosure.
Figure 1C:
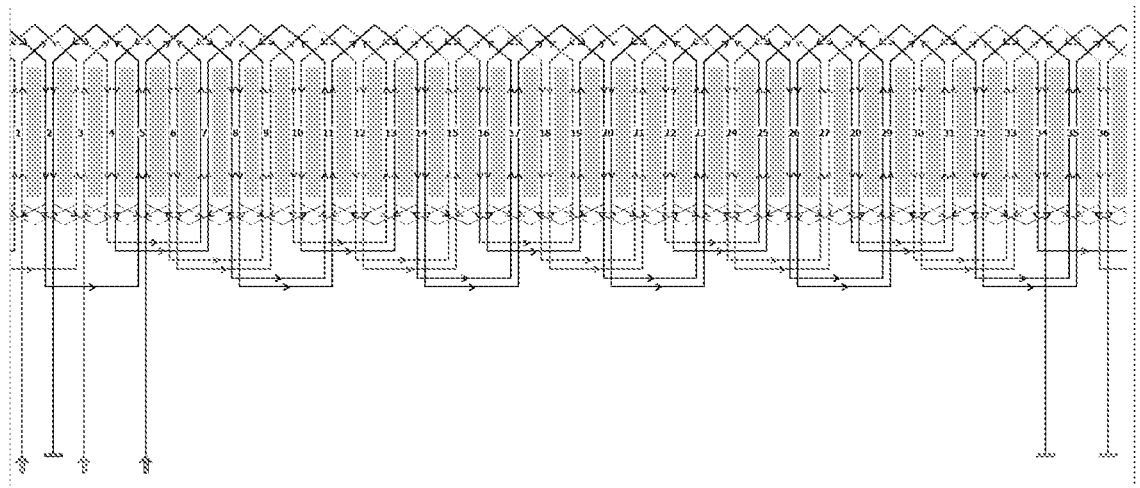
FIG. 1C shows a distributed winding concept that can incorporate connectors according to the disclosure.

As is known, and briefly discussed above, electric motors include a rotor and a stator, conductive coils and magnets, to generate electrical energy. Such motors are well known and will not be described in detail. Connections have to be made between the various windings in the motor as well as connections between the motor parts and external systems.

Many motors use multi-strand wire bundles to form the conductors for the windings so as to minimise eddy currents. It is difficult to connect such windings to each other or to other components without negating the multi-strand effect and/or creating an increased resistance at the connection that results in increased losses.

In conventional motors, different windings are electrically connected to each other by physically overlapping the windings and/or by providing end-windings extending from the ends of the motor where conductors of different phases of the motor pass over the end-windings to form a connection with each other. The end-windings are large and it is, as mentioned above, difficult to provide the necessary electrical and magnetic isolation when the conductors physically overlap each other. Connecting the conductors to other components of the motor or of external systems often uses soldering or brazing which fuses the multi-strand wires together at the ends of the coils.

The solution provided by this disclosure is to provide connections for such conductors either to each other or to other components by means of a printed circuit board (PCB) and, in particular, a heavy copper PCB. The heavy copper PCB allows for the segmentation of the copper into a number of layers, allowing the PCB to be used at high frequencies and for electrical isolation between the different windings since the windings do not need to physically overlap in order to be electrically connected. Using a PCB enables, for example, the windings to be segmented and electrically connected via PCB traces, which improves their use in high frequency operations.

Further, the PCB can be designed such that a bundle of multi-strand wires can be terminated with a stud or a crimp at the ends of the wires, and the stud or crimp physically attached to the PCB by means of the stud without the need to solder or braze the wires. This allows for quick assembly and provides a lower resistance path and a more reliable connection than a solder or braze. Particularly at higher temperatures, soldered or brazed connections can fatigue and present a higher resistance path. Other interconnect technologies can also be adopted, depending on the application e.g. a compliant pin.

In conventional motors, magnetic wires will physically overlap. The physical location of the wire becomes less controlled or repeatable which gives rise to a risk of insulation damage between the wires or segments. This problem can be aggravated by vibration or movement as is, therefore, more of an issue in vibrational environments e.g. in aircraft. Connection via traces of a PCB means that different segments of the same winding can be connected together in a way that the physical location of each conductor can be controlled precisely, thus minimising the risk of insulation damage caused by relative conductor movement- and that different phases and winding channels can be suitably isolated from each other by appropriate spacing either radially or axially between the traces of the PCB. The use of a PCB can be particularly advantageous in making fault tolerant machines more fault tolerant.

Furthermore, the heavy copper PCB is better able to conduct heat away internally within the PCB to an external cooling medium. Further, the use of the heavy copper PCB can reduce copper conduction losses due to the increased fill factor, and can facilitate improved thermal management of the conductor conduction losses by providing a suitable thermal interface; in contrast, conventional insulation on copper wires has very low thermal conductivity, which hinders thermal management. The relatively high thermal conductivity through the substrate reduces temperature increase within the PCB.

FIG. 1A shows one fault tolerant winding concept where different phases are connected on a PCB. Here, alternate windings 1, 5 and 9 are connected to each other by traces 10, 50, 90 and the intermediate windings 3, 7, 11 are connected to each other by traces 30, 70, 110. The windings are separated by gaps 2, 4, 6, 8, 10 and 12. This is an example showing one particular motor topology. There are, however, many other configurations which could be used, depending on the specific application.

In another example, two groups of adjacent windings are formed i.e. windings 1, 3 and 5 are connected to each other and windings 7, 9 and 11 are connected to each other.

The different concepts can be easily formed on a PCB as required for a given application by designing the traces accordingly.

Figure 1D:
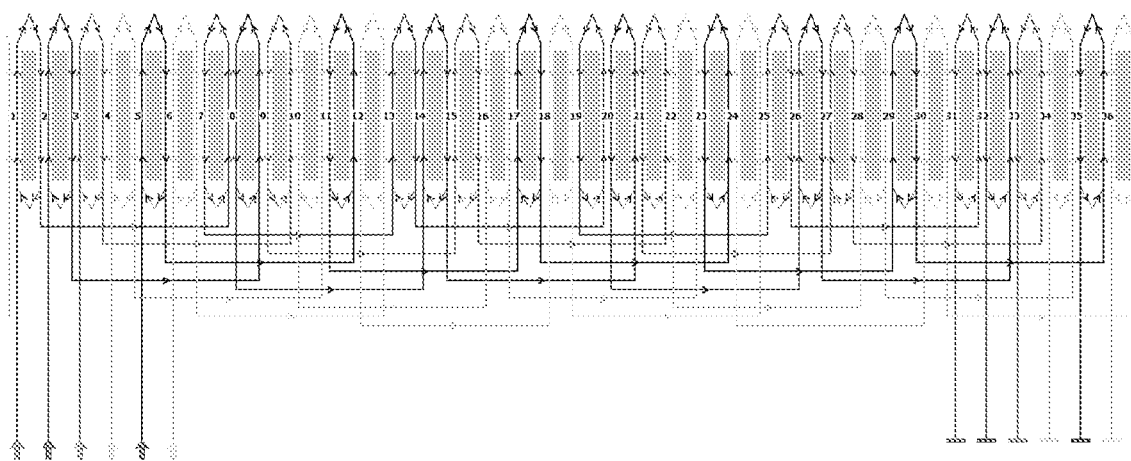
FIG. 1D shows a concentrated winding concept that can incorporate connectors according to the disclosure.

FIG. 10 shows the overlap between different phases in a distributed winding concept and FIG. 1D shows the overlap between phases in a concentrated winding concept. Any of these concepts can be realised by forming appropriate PCB designs.

The use of a PCB as an interconnecting mechanism for all connections provides consistency and ease of design and manufacture. A heavy copper PCB is able to carry higher currents without problems of isolation or losses. The use of a PCB instead of overlapping of magnet wire end-windings also results in a more compact motor design.

The invention claimed is:

1. A connection assembly comprising:
   a printed circuit board (PCB) configured to electrically connect at least a first magnetic wire conductor of a first winding of an electric motor to at least a second magnetic wire conductor of a second winding of the electric motor via a first conductive segment or track of the PCB;
   wherein the first winding does not physically overlap the second winding; and
   wherein the first and second magnetic wire conductors are respectively crimped into first and second studs, the first and second studs physically attached to the PCB and electrically connected to the first conductive segment or track.

2. The connection assembly of claim 1, wherein the PCB is a multi-layer heavy copper PCB.

3. The connection assembly of claim 1, wherein the PCB defines conductive segments separated by insulating segments.

4. The connection assembly of claim 1, wherein the first magnetic wire conductor includes a multi-strand conductor or a single magnet wire conductor.

5. The connection assembly of claim 4, wherein the multi-strand conductor is a Litz wire.

6. The connection assembly of claim 4, wherein the second magnetic wire conductor is also a multi-strand wire conductor or a single magnet wire conductor.

7. The connection assembly of claim 1, wherein:
   the PCB is further configured to electrically connect at least a third magnetic wire conductor of a third winding of the electric motor to the first and second magnetic wire conductors via the first conductive segment or track of the PCB; and
   the third winding does not physically overlap the first winding or the second winding.

8. The connection assembly of claim 7, wherein:
   the PCB is further configured to electrically connect at least a fourth magnetic wire conductor of a fourth winding of the electric motor to a fifth magnetic wire conductor of a fifth winding of the electric motor and a sixth magnetic wire conductor of a sixth winding of the electric motor via a second conductive segment or track of the PCB;
   the fifth winding does not physically overlap the fourth winding; and
   the sixth winding does not physically overlap the fourth winding or the fifth winding.

9. An electric motor comprising:
   a first winding including at least a first magnetic wire conductor;
   a second winding including at least a second magnetic wire conductor, the second winding not physically overlapping the first winding; and
   a printed circuit board (PCB) configured to electrically connect at least the first magnetic wire conductor to the second magnetic wire conductor via a first conductive segment or track of the PCB;
   wherein the first and second magnetic wire conductors are respectively crimped into first and second studs, the first and second studs physically attached to the PCB and electrically connected to the first conductive segment or track.

10. The electric motor of claim 9, further comprising:
a third winding including at least a third magnetic wire conductor, the third winding not physically overlapping the first winding or the second winding;
wherein the PCB is further configured to electrically connect the third magnetic wire conductor to the first and second magnetic wire conductors via the first conductive segment or track of the PCB.

11. The electric motor of claim 10, further comprising:
a fourth winding including at least a fourth magnetic wire conductor;
a fifth winding including at least a fifth magnetic wire conductor, the fifth winding not physically overlapping the fourth winding; and
a sixth winding including at least a sixth magnetic wire conductor, the sixth winding not physically overlapping the fourth winding or the fifth winding;
wherein the PCB is further configured to electrically connect at least the fourth magnetic wire conductor to the fifth and sixth magnetic wire conductors via a second conductive segment or track of the PCB.

12. The electric motor of claim 9, wherein the PCB is a multi-layer heavy copper PCB.

13. The electric motor of claim 9, wherein the PCB defines conductive segments separated by insulating segments.

14. The electric motor of claim 9, wherein the first magnetic wire conductor includes a multi-strand conductor or a single magnet wire conductor.

15. The electric motor of claim 14, wherein the multi-strand conductor is a Litz wire.

16. The electric motor of claim 14, wherein the second magnetic wire conductor is also a multistrand wire conductor or a single magnet wire conductor.

17. A method comprising:
electrically connecting at least a first magnetic wire conductor of a first winding of an electric motor to at least a second magnetic wire conductor of a second winding of the electric motor via a first conductive segment or track of a printed circuit board (PCB);
wherein the first winding does not physically overlap the second winding; and
wherein the first and second magnetic wire conductors are respectively crimped into first and second studs, the first and second studs physically attached to the PCB and electrically connected to the first conductive segment or track.

18. The method of claim 17, further comprising:
electrically connecting a third wire conductor of a third winding of the electric motor to the first and second magnetic wire conductors via the first conductive segment or track of the PCB;
wherein the third winding does not physically overlap the first winding or the second winding.

19. The method of claim 18, further comprising:
electrically connecting at least a fourth magnetic wire conductor of a fourth winding of the electric motor to a fifth magnetic wire conductor of a fifth winding of the electric motor and a sixth magnetic wire conductor of a sixth winding of the electric motor via a second conductive segment or track of the PCB;
wherein the fifth winding does not physically overlap the fourth winding; and
wherein the sixth winding does not physically overlap the fourth winding or the fifth winding.

20. The method of claim 19, wherein the PCB is a multi-layer heavy copper PCB.

* * * * *